(12) United States Patent
Suzuki et al.

(10) Patent No.: US 7,717,818 B2
(45) Date of Patent: May 18, 2010

(54) POWER TRANSMISSION APPARATUS

(75) Inventors: Kunihiko Suzuki, Gamagoori (JP);
Shinichiro Nakajima, Niiza (JP);
Hiroshi Kushino, Obu (JP)

(73) Assignee: JTEKT Corporation, Osaka-shi (JP)

( * ) Notice: Subject to any disclaimer, the term of this patent is extended or adjusted under 35 U.S.C. 154(b) by 338 days.

(21) Appl. No.: 11/560,064

(22) Filed: Nov. 15, 2006

(65) Prior Publication Data
US 2007/0111842 A1 May 17, 2007

(30) Foreign Application Priority Data
Nov. 15, 2005 (JP) ............................. 2005-329959

(51) Int. Cl.
*F16H 48/30* (2006.01)
(52) U.S. Cl. ...................... 475/150; 475/249
(58) Field of Classification Search ................ 475/150, 475/160, 249, 901, 317, 290
See application file for complete search history.

(56) References Cited

U.S. PATENT DOCUMENTS

| | | | |
|---|---|---|---|
| 4,031,780 A | 6/1977 | Dolan et al. | |
| 4,612,824 A * | 9/1986 | Ruhle | 475/204 |
| 5,269,730 A | 12/1993 | Hirota | |
| 5,423,726 A * | 6/1995 | Kota et al. | 475/206 |
| 5,846,153 A * | 12/1998 | Matsuoka | 475/269 |
| 6,796,412 B2 | 9/2004 | Teraoka | 192/35 |
| 7,144,347 B2 * | 12/2006 | Kushino | 475/249 |
| 7,276,010 B2 * | 10/2007 | Kushino | 475/249 |
| 7,361,117 B2 * | 4/2008 | Yamazaki et al. | 475/249 |
| 2002/0027056 A1 * | 3/2002 | Ikeda et al. | 192/54.4 |
| 2002/0049110 A1 | 4/2002 | Ishikawa | |
| 2002/0125095 A1 * | 9/2002 | Ochab et al. | 192/35 |
| 2002/0134605 A1 | 9/2002 | Bowen et al. | |
| 2003/0190993 A1 * | 10/2003 | Ohkubo et al. | 475/317 |
| 2004/0147356 A1 | 7/2004 | Baxter, Jr. et al. | |
| 2005/0148424 A1 * | 7/2005 | Kushino | 475/249 |
| 2007/0105684 A1 * | 5/2007 | Gassmann et al. | 475/249 |

FOREIGN PATENT DOCUMENTS

JP 9-144845 6/1997

OTHER PUBLICATIONS

U.S. Appl. No. 12/238,604, filed Sep. 26, 2008, Nakajima.

* cited by examiner

*Primary Examiner*—David D Le
*Assistant Examiner*—Justin Holmes
(74) *Attorney, Agent, or Firm*—Oblon, Spivak, McClelland, Maier & Neustadt, L.L.P.

(57) ABSTRACT

A power transmission apparatus is provided with a housing, which rotates together with an input shaft, a differential mechanism, and a main clutch. The main clutch links the input shaft and the first output shaft. The differential mechanism distributes drive force that is inputted from the input shaft via the housing into a first output shaft and a second output shaft. The differential mechanism is provided with a ring gear that is provided within the housing, a sun gear that is provided within the ring gear, and a planetary gear. The planetary gear is engaged with the ring gear and the sun gear and supported in such a manner as to be orbital and rotational. The first output shaft is linked to the ring gear. The main clutch is formed of a plurality of outer clutch plates and inner clutch plates, which are provided on the inner circumferential surface of the housing and on the outer circumferential surface of the ring gear.

9 Claims, 4 Drawing Sheets

POWER TRANSMISSION APPARATUS

BACKGROUND OF THE INVENTION

The present invention relates to a power transmission apparatus.

Conventional power transmission apparatuses have been known, which transmit drive force inputted from a driving source to two output shafts using a differential mechanism and distribute the drive force into the two output shafts by linking the input shaft to one of the output shafts using a clutch mechanism.

The power transmission apparatus described in Japanese Laid-Open Patent Publication No. 9-144845, for example, is provided with a differential case which is rotated by drive force from a driving source and a differential mechanism that is contained within the differential case. The differential mechanism is provided with a sun gear, an internal gear and a pinion gear. The sun gear and the internal gear are contained within the differential case so as to be freely rotatable. The pinion gear is contained in a accommodation hole within the differential gear so as to be freely rotatable in an engaged state with the sun gear and the internal gear. In the apparatus described in this document, the pinion gear is contained in the accommodation hole within the differential case so as to be freely rotatable, and therefore, a carrier for supporting the pinion gear can be omitted, so that a space can accordingly be created in a location adjacent to the pinion gear. A clutch mechanism for linking the sun gear and the internal gear is provided in this space, and thus, reduction in the number of parts, miniaturization and reduction in weight can be achieved.

However, the space that is created by omitting the carrier, that is to say, the space between the sun gear and the internal gear, is extremely small. In this case, the volume of the clutch that is placed in the space between the sun gear and the internal gear is limited, and therefore, it is difficult to transmit greater torque to this clutch. Therefore, in the case of the conventional apparatus, it is necessary to increase the space between the sun gear and the internal gear in the axial direction, so that the space can accommodate a clutch having a large capacity for transmitting greater torque. Thus, the apparatus inevitably becomes long in the axial direction, which causes a problem such that the length in the axial direction and the weight of the transfer (or differential) for containing this apparatus increase.

SUMMARY OF THE INVENTION

Accordingly, it is an objective of the present invention to provide a power transmission apparatus of which the length in the axial direction can be reduced and which can transmit a greater drive force.

In accordance with one aspect of the present invention, a power transmission apparatus including a housing, a differential mechanism, a clutch mechanism, and a driving device is provided. The housing is placed coaxially with an input shaft and is linked to the input shaft. The differential mechanism is contained within the housing, and distributes drive force that is inputted from the input shaft via the housing to a first output shaft and a second output shaft. The clutch mechanism links the input shaft with either the first or second output shaft. The driving device drives the clutch mechanism. The differential mechanism includes a ring gear, a sun gear, and a planetary gear. The ring gear is provided coaxially with the housing so as to be freely rotatable within the housing. The sun gear is provided coaxially with the ring gear so as to be freely rotatable within the ring gear. The planetary gear is engaged with the ring gear and the sun gear. The planetary gear is supported by a carrier provided in the housing in such a manner as to be orbital and rotatable. Each output shaft is linked to either the ring gear or the sun gear. The clutch mechanism is a friction clutch formed by a plurality of clutch plates. Each clutch plate is provided on the inner circumferential surface of the housing or on the outer circumferential surface of the ring gear.

Other aspects and advantages of the invention will become apparent from the following description, taken in conjunction with the accompanying drawings that illustrate by way of example the principles of the invention.

BRIEF DESCRIPTION OF THE DRAWINGS

The invention, together with the objects and the advantages thereof, may best be understood by reference to the following description of the presently preferred embodiments, together with the accompanying drawings in which.

DETAILED DESCRIPTION OF THE PREFERRED EMBODIMENTS

In the following, one embodiment of the present invention is described in reference to the drawings.

Figure 1:
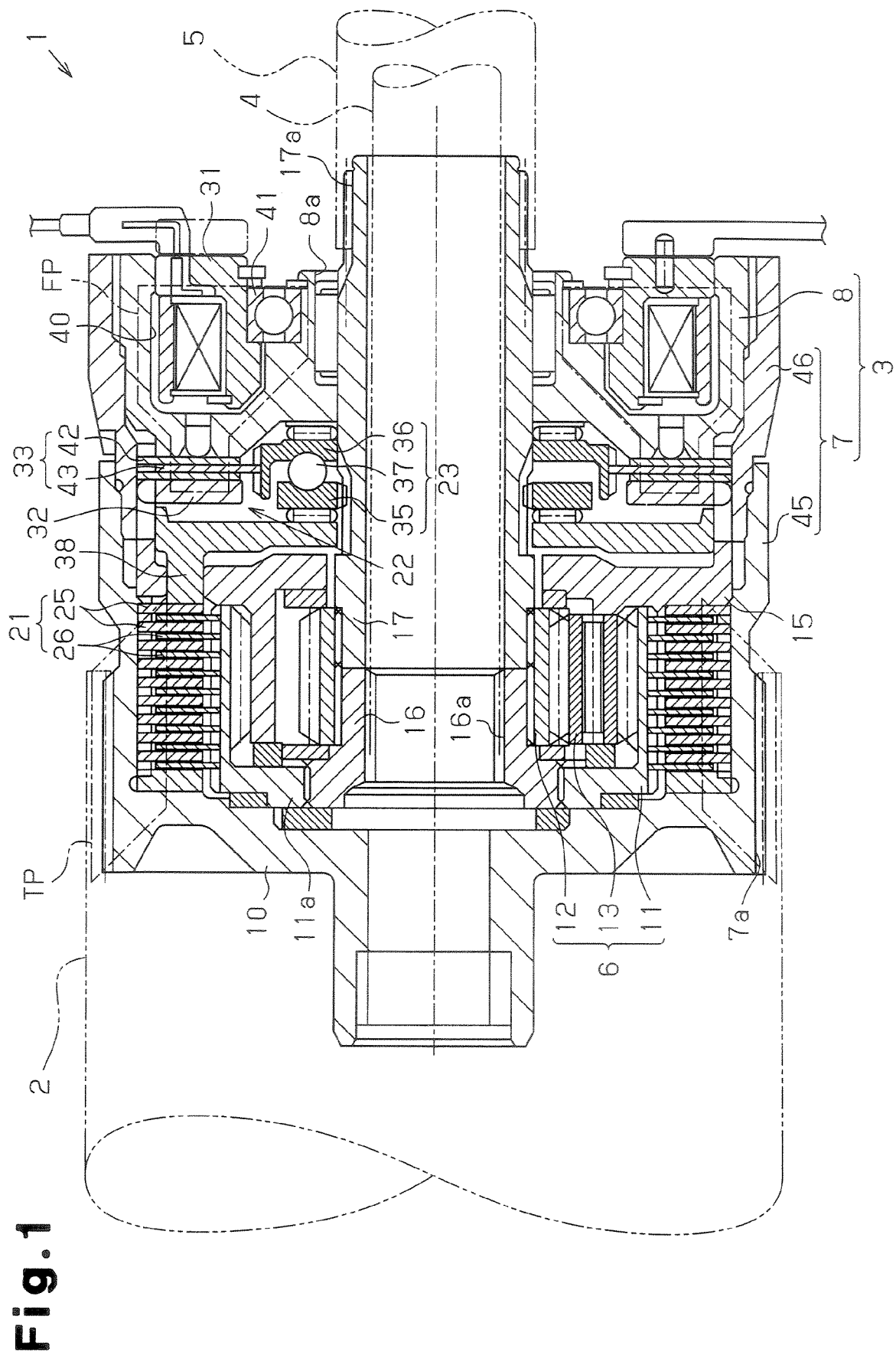
FIG. 1 is a cross-sectional view showing a power transmission apparatus according to one present embodiment.

As shown in FIG. 1, a power transmission apparatus 1 is provided with a housing 3 that is placed coaxially with an input shaft 2, and a differential mechanism 6 that is contained within the housing 3. The housing 3 is linked to the input shaft 2 so as to be rotatable together with this input shaft 2. The differential mechanism 6 distributes drive force that is inputted from the input shaft 2 via the housing 3 to a first output shaft 4 and a second output shaft 5.

The housing 3 is formed of a cylindrical front housing member 7 with a bottom and an annular rear housing member 8, and the rear housing member 8 is mounted on the inner circumferential surface in the opening of the front housing member 7. A spline 7a is formed on the outer circumferential surface on the bottom 10 in the front housing member 7, that is to say, in the portion linked to the input shaft 2. The differential mechanism 6 is placed in the vicinity of the bottom 10 within the front housing member 7.

The differential mechanism 6 uses a planetary gear mechanism made up of a ring gear 11, a sun gear 12 and a planetary gear 13. The ring gear 11 is provided coaxially with the front housing member 7 within the front housing member 7 so as to be freely rotatable. The sun gear 12 is provided coaxially with the ring gear 11 within the ring gear 11 so as to be freely rotatable. The planetary gear 13 is engaged with the ring gear 11 and the sun gear 12, and is supported by a carrier 15 that is secured on the inner circumferential surface of the front housing member 7 so as to be orbital and rotatable.

The sun gear 12 is formed to be cylindrical. A cylindrical first shaft 16 and a cylindrical second shaft 17 are provided within the sun gear 12 so as to be freely rotatable. The first and second shafts 16 and 17 are placed coaxially with the sun gear 12 and the ring gear 11. A flange 11a is provided around the inner periphery of the end portion of the ring gear 11 that is located in the vicinity of the bottom 10 of the front housing member 7. The first shaft 16 is engaged with the inner circumferential surface of the flange 11a with a spline. The second shaft 17 is engaged with the inner circumferential surface of the flange 11a with a spline. The first shaft 16 rotates together with the ring gear 11, and the second shaft 17 rotates together with the sun gear 12.

The outer diameter of the second shaft 17 is set to be slightly greater than the outer diameter of the first shaft 16. The second shaft 17 is provided in a location closer to the opening of the front housing member 7 than the first shaft 16. A center hole 8a is provided at the center of the rear housing member 8. The second shaft 17 is inserted into the center hole 8a of the rear housing member 8 in such a manner that a portion of the second shaft 17 protrudes outward from the housing 3. A spline 16a is formed on the inner circumferential surface of the first shaft 16, that is to say, in the portion where the first shaft 16 and the first output shaft 4 are linked. In addition, a spline 17a is formed on the outer circumferential surface of the second shaft 17 that protrudes from the housing 3, that is to say, in the portion where the second shaft 17 and the second output shaft 5 are linked. The spline 16a links the first shaft 16 to the first output shaft 4, and the spline 17a links the second shaft 17 to the second output shaft 5.

The housing 3 and the carrier 15 rotate together with the input shaft 2, and together with this rotation, the planetary gear 13 that is supported by the carrier 15 orbits. In this manner, the drive force that is inputted from the input shaft 2 via the housing 3 is distributed to the ring gear 11 and the sun gear 12 which are respectively engaged with the planetary gear 13. The drive force that is transmitted to the ring gear 11 is transmitted to the first output shaft 4 via the first shaft 16, and the drive force that is transmitted to the sun gear 12 is transmitted to the second output shaft 5 via the second shaft 17.

In addition, the power transmission apparatus 1 is provided with a main clutch 21, which is a clutch mechanism, and an electromagnetic clutch 22 and a cam mechanism 23, which are a driving device. The main clutch 21 links the input shaft 2 and the first output shaft 4, the electromagnetic clutch 22 drives the main clutch 21, and the cam mechanism 23 amplifies the drive force of the electromagnetic clutch 22 and transmits the resulting drive force to the main clutch 21.

The main clutch 21, which is a multiple plate type friction clutch, is placed in the space between the inner circumferential surface of the front housing member 7 and the outer circumferential surface of the ring gear 11. The main clutch 21 is formed of a plurality of outer clutch plates 25 and inner clutch plates 26. The outer clutch plates 25 are provided on the inner circumferential surface of the front housing member 7, and the inner clutch plates 26 are provided on the outer circumferential surface of the ring gear 11. The outer clutch plates 25 and the inner clutch plates 26 are respectively placed alternately and coaxially, and are placed so as to be slidable against each other. The outer clutch plates 25 and the inner clutch plates 26 are engaged with the inner circumferential surface of the front housing member 7 and the outer circumferential surface of the ring gear 11, respectively, with a spline. As a result, when a drive force is inputted from the input shaft 2, the outer clutch plates 25 and the inner clutch plates 26 rotate relative to each other. The outer clutch plates 25 and the inner clutch plates 26 contact each other and are engaged with each other through friction, and thereby, the input shaft 2 and the first output shaft 4 are linked.

The electromagnetic clutch 22 is provided with an electromagnet 31, which is a driving source, an armature 32, and a pilot clutch 33. The armature 32 is annular and provided between the rear housing member 8 and a piston 38, which will be discussed below. The pilot clutch 33 is provided between the armature 32 and the rear housing member 8. The pilot clutch 33 is made up of a plurality of outer clutch plates 42 and an inner clutch plate 43. An annular groove 40 having a U-shaped cross-section and an opening facing outward is created in the rear housing member 8. An electromagnet 31 is supported by a bearing 41 within the annular groove 40 so as to be rotatable relative to the housing 3.

The armature 32 is attracted by the electromagnetic force of the electromagnet 31, and thus, shifts along the axial line so as to contact and separate from the pilot clutch 33. As the armature 32 shifts, the outer clutch plates 42 and the inner clutch plate 43 are engaged within the pilot clutch 33. The engagement force in the pilot clutch 33 is transmitted to the main clutch 21 via the cam mechanism 23 and converted into a thrust force in the axial direction for engaging the outer clutch plates 25 and the inner clutch plates 26 in this main clutch 21.

The cam mechanism 23 is placed coaxially with the second shaft 17 in a location closer to the opening of the front housing member 7 than the differential mechanism 6 and the main clutch 21. The cam mechanism 23 is provided with a pair of substantially annular cams 35 and 36, and a spherical cam follower 37.

Specifically, the first cam 35 which faces the main clutch 21 is engaged with the outer circumferential surface of the second shaft 17 with a spline. As a result, the first cam 35 is supported in such a manner as to be moveable in the axial direction relative to the second shaft 17 and rotatable together with the second shaft 17. Meanwhile, the second cam 36 is supported in a location closer to the opening of the front housing member 7 than the first cam 35 in such a manner as to be rotatable relative to the second shaft 17. In addition, the cam follower 37 is supported in annular grooves created in the two facing surfaces of the first cam 35 and the second cam 36. When the first cam 35 and the second cam 36 rotate relative to each other, the cam mechanism 23 generates a thrust force which works in the axial direction in accordance with a change in the depth of the annular grooves.

A piston 38 is provided to the carrier 15 which is adjacent to the differential mechanism 6 so as to be moveable in the axial direction. The rear portion of the piston 38 contacts the first cam 35, and the front portion of the piston 38 contacts the main clutch 21. In addition, the thrust force generated by the cam mechanism 23 is transmitted to the main clutch 21 via the piston 38.

Like the main clutch 21, the pilot clutch 33 is a multiple plate type friction clutch. In the pilot clutch 33, the outer clutch plates 42 are engaged with the inner circumferential surface of the front housing member 7 with a spline, and the inner clutch plate 43 is engaged with the outer circumferential surface of the second cam 36 with a spline. The armature 32 is engaged with the inner circumferential surface of the front housing member 7 with a spline so as to be moveable in the axial direction.

When the electromagnet 31 is energized, a magnetic flux path FP is formed in the rear housing member 8 and the armature 32. The magnetic force of this magnetic flux path FP makes the armature 32 move in the axial direction so as to approach the rear housing member 8. Thus, the pilot clutch 33 is held between the armature 32 and the rear housing member 8, and the outer clutch plates 42 and the inner clutch plate 43 are engaged with each other.

The front housing member 7 is formed of a cylindrical first member 45 with a bottom and a substantially cylindrical second member 46. The differential mechanism 6 and the main clutch 21 are contained within the first member 45. The second member 46 is secured in the opening of the first member 45. The second member 46 is formed of an aluminum alloy, which is a nonmagnetic material. The rear housing member 8 which is mounted on the inner circumferential surface of the second member 46 is formed of a magnetic material (for example a soft iron material, such as S10). In this configuration, the magnetic force from the electromagnet 31 can be prevented from leaking to the outside by the second member 46, even when a magnetic flux path FP is formed in the rear housing member 8. As a result, the magnetic force of the electromagnet 31 can be effectively used.

When the outer clutch plates 42 and the inner clutch plate 43 are engaged in a state where the input shaft 2 is rotating, the second cam 36 rotates together with the front housing member 7. At this time, the first cam 35 and the second cam 36 rotate relative to each other, and thereby, a thrust force which works in the axial direction is generated in the cam mechanism 23. When this thrust force is transmitted to the main clutch 21 via the piston 38, the outer clutch plates 25 and the inner clutch plate 26 are engaged. Thus, the engagement force links the front housing member 7 and the ring gear 11, and a torque is transmitted from the input shaft 2 to the first output shaft 4. As a result, the differential mechanism 6 is controlled.

The following advantages can be gained according to the present embodiment.

(1) The power transmission apparatus 1 is provided with the housing 3, which rotates together with the input shaft 2, and the differential mechanism 6. The differential mechanism 6 distributes the drive force which is inputted from the input shaft 2 via the housing 3 to the first output shaft 4 and the second output shaft 5. The power transmission apparatus 1 is further provided with the main clutch 21 for linking the input shaft 2 and the first output shaft 4, and the electromagnetic clutch 22 for driving the main clutch 21. The differential mechanism 6 is provided with the ring gear 11, the sun gear 12 and the planetary gear 13. The ring gear 11 is provided coaxially with the housing 3 so as to be freely rotatable within the housing 3. In addition, the sun gear 12 is provided coaxially with the ring gear 11 so as to be freely rotatable within the ring gear 11. The planetary gear 13 is engaged with the ring gear 11 and the sun gear 12 and supported in such a manner as to be orbital and rotatable. The first output shaft 4 is linked to the ring gear 11. A plurality of outer clutch plates 25 and inner clutch plates 26, which form the main clutch 21, are placed alternately and coaxially. The outer clutch plates 25 and the inner clutch plates 26 are placed so as to be slidable against each other, and are provided on the inner circumferential surface of the front housing member 7 and on the outer circumferential surface of the ring gear 11, respectively.

In this configuration, the main clutch 21 is placed between the inner circumferential surface of the housing 3 and the outer circumferential surface of the ring gear 11, and therefore, the power transmission apparatus 1 can be made shorter in the axial direction. In addition, the space created between the inner circumferential surface of the housing 3 and the outer circumferential surface of the ring gear 11 has the length in the same axial direction as the ring gear 11. In this case, the number of outer clutch plates 25 and inner clutch plates 27 can be increased in comparison with conventional apparatuses, and in addition, outer clutch plates 25 and inner clutch plates 26 having a greater effective diameter can be used. Accordingly, greater torque can be transmitted.

(2) The power transmission apparatus 1 is provided with the electromagnetic clutch 22 for driving the main clutch 21. In addition, the housing 3 is provided with the front housing member 7 and the rear housing member 8 which is mounted on the inner circumferential surface of the front housing member 7. The spline 7a for linking the housing 3 and the input shaft 2, the differential mechanism 6, and the main clutch 21 are all provided in the vicinity of the bottom 10 of the front housing member 7. Meanwhile, the electromagnet 31 is placed within the annular groove 40 of the rear housing member 8.

In this configuration, a torque transmitting path TP (see FIG. 1) which is formed in the front housing member 7 of the housing 3, that is to say, the path through which torque is transmitted from the input shaft 2 to the main clutch 21 via the spline 7a and the magnetic flux path FP which is formed in the rear housing member 8 do not overlap. As a result, a material having a high rigidity can be used for the front housing member 7 for transmitting torque, and a material having high susceptibility can be used for the rear housing member 8 in which the magnetic flux path FP is formed. Accordingly, greater torque can be transmitted, so that the responsiveness of torque transmission is enhanced.

(3) The front housing member 7 is provided with the cylindrical first member 45 with a bottom for containing the differential mechanism 6 and the main clutch 21, and the substantially cylindrical second member 46, which is secured in the opening of the first member 45. The second member 46 is formed of a nonmagnetic material, and the rear housing member 8 is mounted on the inner circumferential surface of the second member 46.

In this configuration, the magnetic force from the electromagnet 31 is prevented from leaking to the outside by the second member 46 which is made of a nonmagnetic material, even when a magnetic flux path FP is formed in the rear housing member 8. As a result, the magnetic force of the electromagnet 31 can be effectively used, and therefore, the drive force and the responsiveness of the electromagnetic clutch 22 are enhanced.

The present embodiment may be modified as follows.

In the present embodiment, the spline 7a for linking the power transmission apparatus 1 and the input shaft 2, the differential mechanism 6, and the main clutch 21 are all provided in the vicinity of the bottom 10 of the front housing member 7. In addition, the electromagnet 31 is placed within the annular groove 40 of the rear housing member 8. The invention is not limited to this arrangement, and the portion for linking the power transmission apparatus 1 and the input shaft 2, and the portion for linking the front housing member 7 and the rear housing member 8 may be modified so as to have any configuration, as long as the torque transmitting path TP and the magnetic flux path FP do not overlap.

Figure 2:
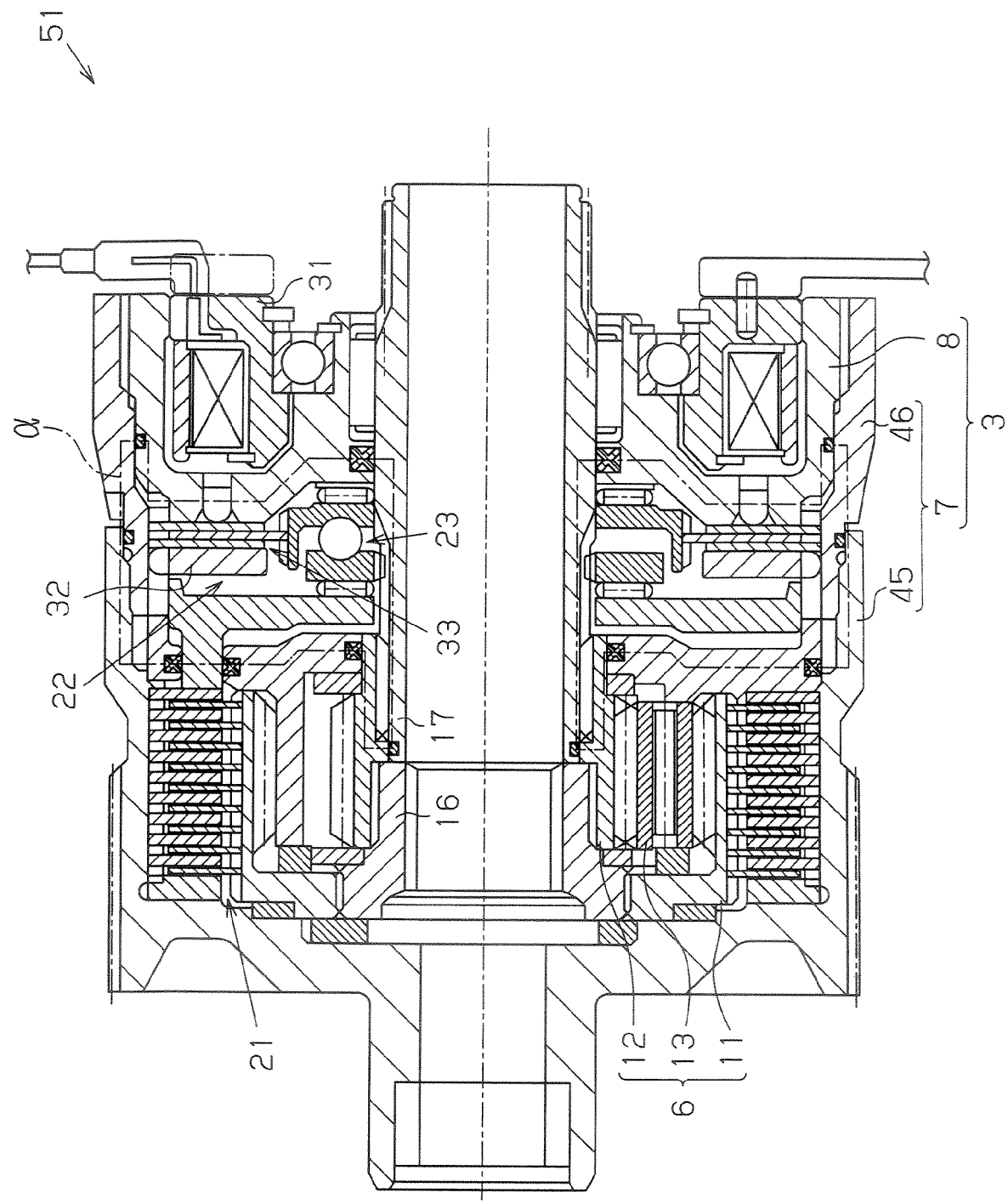
FIG. 2 is a cross-sectional view showing a power transmission apparatus according to a modified embodiment.
Figure 3:
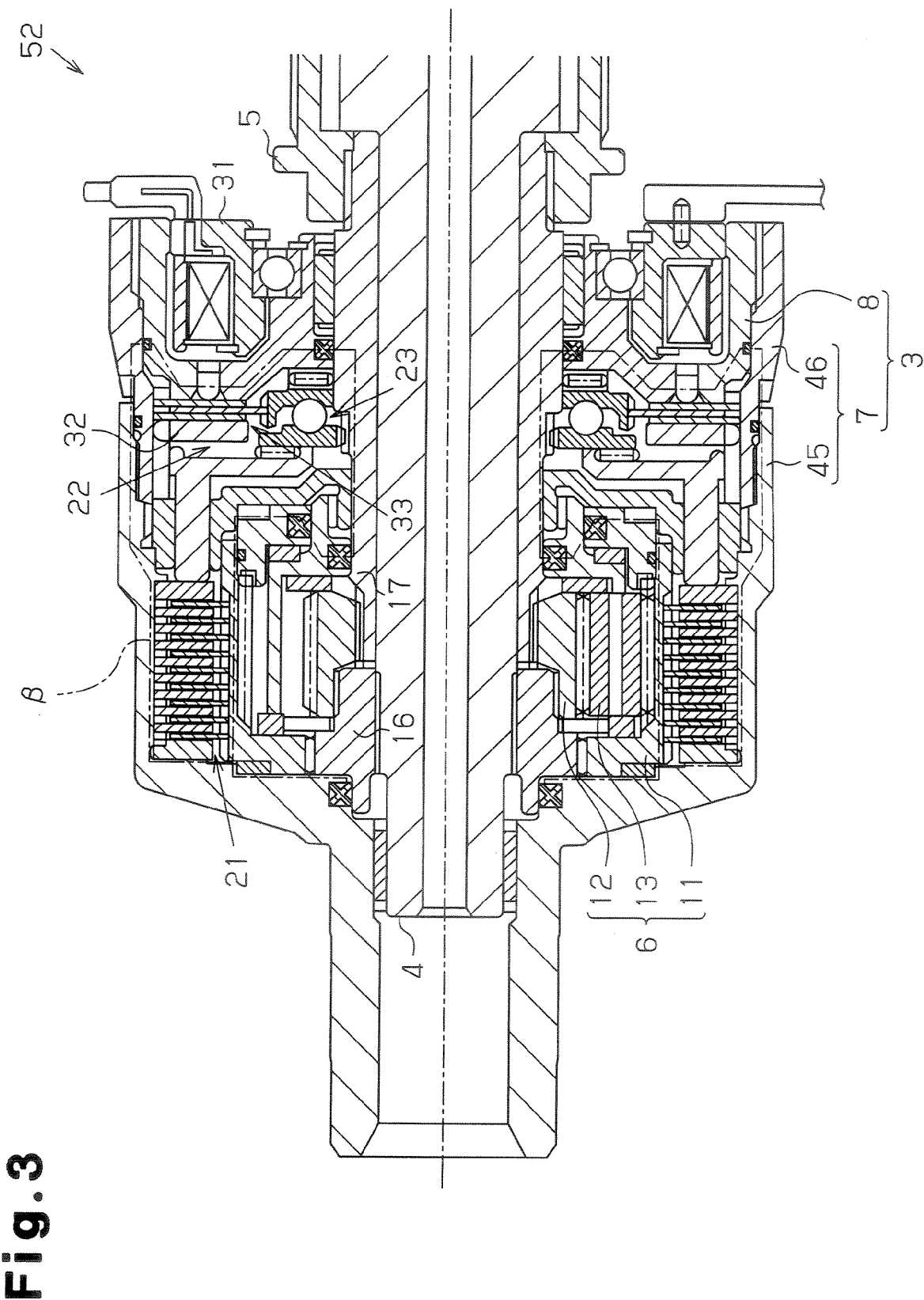
FIG. 3 is a cross-sectional view showing a power transmission apparatus according to another modified embodiment.
Figure 4:
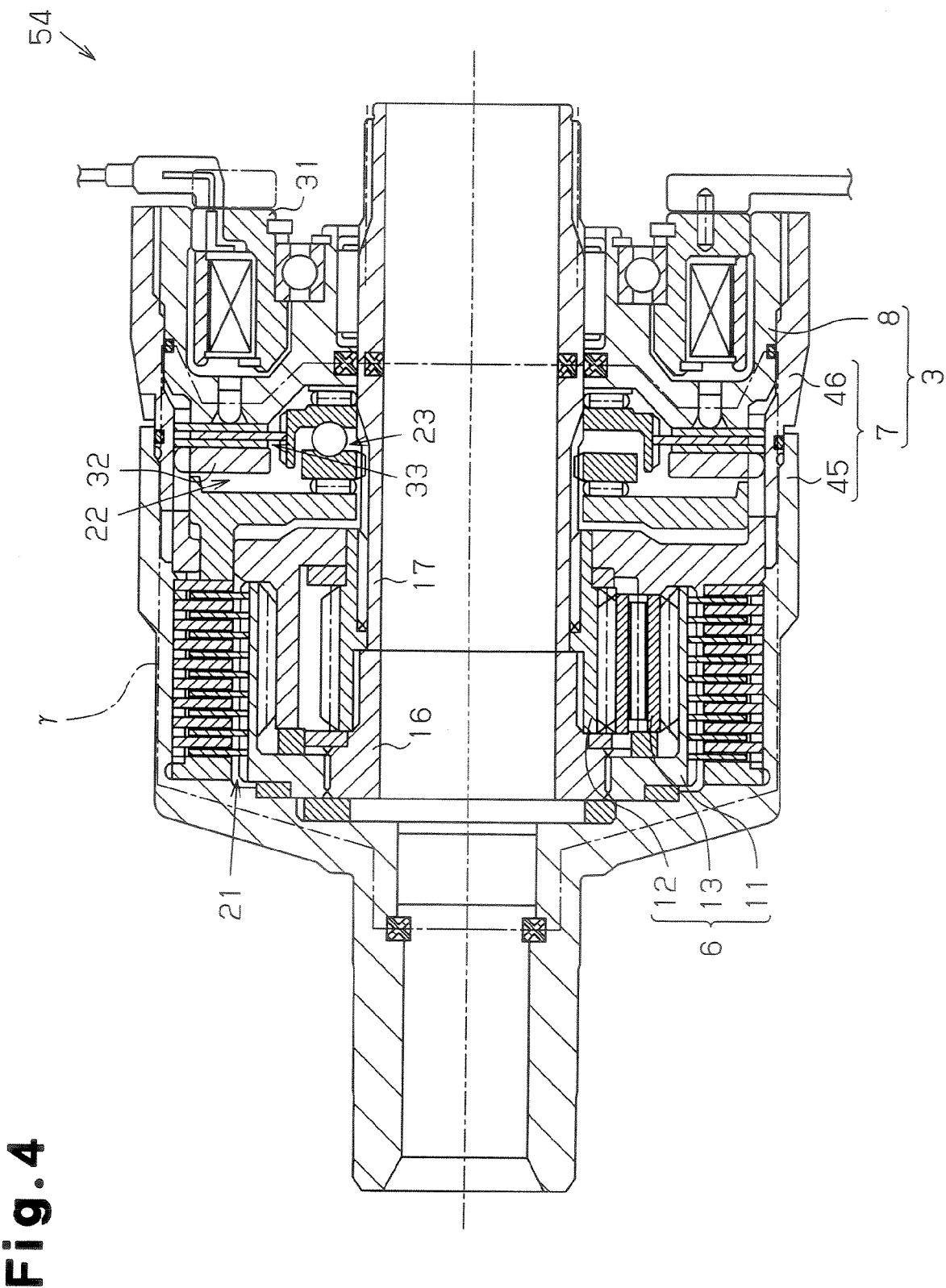
FIG. 4 is a cross-sectional view showing a power transmission apparatus according to still another modified embodiment.

As in a power transmission apparatus 51 shown in FIG. 2, for example, a sealing member, such as an O ring or an X ring, may be placed so that a region α for containing the pilot clutch 33 and the cam mechanism 23 is sealed in a fluid-tight manner. In addition, as in a power transmission apparatus 52 shown in FIG. 3, a sealing member may be placed so that a region β where the portion for containing the main clutch 21 is added to the above described region α can be sealed in a fluid-tight manner. Furthermore, as in a power transmission apparatus 54 shown in FIG. 4, a sealing member may be placed so that a region γ which corresponds to the entirety of the inside of the housing 3 can be sealed in a fluid-tight manner.

In the present embodiment, the second member 46 may be formed of a nonmagnetic material other than an aluminum alloy.

The invention claimed is:

1. A power transmission apparatus, comprising:
a housing extending parallel to an input shaft and being linked to the input shaft;
a differential mechanism contained within the housing, the differential mechanism distributing drive force that is inputted from the input shaft via the housing to a first output shaft and a second output shaft;
a clutch mechanism for linking the input shaft with either the first or second output shaft; and
a driving device for driving the clutch mechanism,
wherein the differential mechanism comprises: a ring gear which is provided coaxially with the housing so as to be freely rotatable within the housing; a sun gear which is provided coaxially with the ring gear so as to be freely rotatable within the ring gear; and a planetary gear which is engaged with the ring gear and the sun gear, wherein the planetary gear and an outer peripheral portion of the ring gear each have gear portions which engage to transmit torque through the differential mechanism,
wherein the planetary gear is supported by a carrier provided in the housing in such a manner as to be orbital and rotatable,
wherein each output shaft is linked to either the ring gear or the sun gear,
wherein the clutch mechanism is a friction clutch formed by a plurality of clutch plates,
wherein the driving device comprises a piston that extends through said carrier at a location radially outside of said ring gear, and
wherein the outer peripheral portion of the ring gear has a diameter sufficiently smaller than the inner circumferential surface of the housing to accommodate clutch plates placed therebetween, and all of said clutch plates are provided on one of the inner circumferential surface of the housing and the outer circumferential surface of the outer peripheral portion of the ring gear.

2. The power transmission apparatus according to claim 1, wherein
the driving device comprises an electromagnetic clutch for driving the clutch mechanism and a cam mechanism for amplifying the drive force of the electromagnetic clutch and transmitting the resulting drive force to the clutch mechanism.

3. The power transmission apparatus according to claim 1, wherein
the driving device includes, as a driving source, an electromagnet for forming a magnetic flux path in a portion of the housing,
wherein the housing comprises a first housing in which a portion linked to the input shaft and the clutch mechanism are provided, and a second housing in which a magnetic flux path is formed by the electromagnet, and
wherein the two housings are arranged so that a magnetic flux path formed in the second housing and a torque transmitting path formed in the first housing do not overlap.

4. The power transmission apparatus according to claim 2, further comprising:
a sealing member for sealing a region for containing the electromagnetic clutch and the cam mechanism in a fluid-tight manner.

5. The power transmission apparatus according to claim 2, further comprising:
a sealing member for sealing a region for containing the electromagnetic clutch, the cam mechanism, and the clutch mechanism in a fluid-tight manner.

6. The power transmission apparatus according to claim 2, further comprising:
a sealing member for sealing the entirety of the inside of the housing in a fluid-tight manner.

7. A power transmission apparatus comprising:
a housing extending parallel to an input shaft and being linked to the input shaft;
a differential mechanism contained within the housing, the differential mechanism distributing drive force that is inputted from the input shaft via the housing to a first output shaft and a second output shaft;
a clutch mechanism for linking the input shaft with either the first or second output shaft; and
a driving device for driving the clutch mechanism,
wherein the differential mechanism comprises: a ring gear which is provided coaxially with the housing so as to be freely rotatable within the housing; a sun gear which is provided coaxially with the ring gear so as to be freely rotatable within the ring gear; and a planetary gear which is engaged with the ring gear and the sun gear,
wherein the planetary gear is supported by a carrier provided in the housing in such a manner as to be orbital and rotatable,
wherein each output shaft is linked to either the ring gear or the sun gear,
wherein the clutch mechanism is a friction clutch formed by a plurality of clutch plates, and
wherein all of said clutch plates are provided on one of the inner circumferential surface of the housing and the outer circumferential surface of the ring gear,
wherein the driving device includes, as a driving source, an electromagnet for forming a magnetic flux path in a portion of the housing,
wherein the housing comprises a first housing in which a portion linked to the input shaft and the clutch mechanism are provided, and a second housing in which a magnetic flux path is formed by the electromagnet, and
wherein the two housings are arranged so that a magnetic flux path formed in the second housing and a torque transmitting path formed in the first housing do not overlap,
wherein the first housing is formed of a cylindrical first member with a bottom in which the portion linked to the input shaft and the clutch mechanism are provided, and a cylindrical second member which is secured in an opening of the first member,
wherein the second member is formed of a nonmagnetic material and the second housing is mounted on the inner circumferential surface of the second member.

8. The power transmission apparatus according to claim 7, wherein
the second member is formed of an aluminum alloy, which is a nonmagnetic material.

9. The power transmission apparatus according to claim 1, wherein
the housing is placed coaxially with the input shaft.

* * * * *